United States Patent
Feng et al.

(10) Patent No.: US 8,954,799 B2
(45) Date of Patent: Feb. 10, 2015

(54) CIRCUIT FOR DISPLAYING FAILURE INFORMATION OF POWER SUPPLY UNIT

(75) Inventors: Lan-Yi Feng, Shenzhen (CN); Ying-Bin Fu, Shenzhen (CN)

(73) Assignee: ScienBiziP Consulting(Shenzhen)Co., Ltd., Guangdong (CN)

( * ) Notice: Subject to any disclaimer, the term of this patent is extended or adjusted under 35 U.S.C. 154(b) by 285 days.

(21) Appl. No.: 13/531,725

(22) Filed: Jun. 25, 2012

(65) Prior Publication Data

US 2013/0103979 A1    Apr. 25, 2013

(30) Foreign Application Priority Data

Oct. 19, 2011  (CN) .......................... 2011 1 0318406

(51) Int. Cl.
*G06F 11/00* (2006.01)
*G06F 1/28* (2006.01)

(52) U.S. Cl.
CPC ........................................ *G06F 1/28* (2013.01)
USPC .............................................. 714/22; 714/14

(58) Field of Classification Search
CPC ......... G06F 11/22; G06F 1/28; G06F 11/325; G06F 11/326; G06F 1/26; G06F 11/0757; G06F 11/20; G06F 11/2015; G06F 11/2221; G06F 1/1616; G06F 1/1684; G06F 1/263; G06F 1/3218; G06F 1/3265; G06F 3/02
USPC .......................................................... 714/22
See application file for complete search history.

(56) References Cited

U.S. PATENT DOCUMENTS

| | | | | | |
|---|---|---|---|---|---|
| 4,531,214 | A | * | 7/1985 | Torres et al. | 714/22 |
| 5,017,844 | A | * | 5/1991 | Lendaro | 315/408 |
| 5,491,794 | A | * | 2/1996 | Wu | 714/23 |
| 5,646,535 | A | * | 7/1997 | Dornier | 324/556 |
| 5,822,198 | A | * | 10/1998 | Fraidlin et al. | 363/17 |
| 6,275,946 | B1 | * | 8/2001 | Meir | 713/300 |
| 6,414,856 | B1 | * | 7/2002 | Ambatipudi et al. | 363/21.12 |
| 6,434,030 | B1 | * | 8/2002 | Rehm et al. | 363/97 |
| 6,915,440 | B2 | * | 7/2005 | Berglund et al. | 713/340 |
| 6,965,300 | B2 | * | 11/2005 | Lee | 340/309.16 |
| 7,000,147 | B2 | * | 2/2006 | Hsu | 714/22 |
| 7,076,670 | B1 | * | 7/2006 | Krause et al. | 713/300 |
| 7,308,614 | B2 | * | 12/2007 | Kojori | 714/47.2 |
| 7,675,196 | B2 | * | 3/2010 | Kimura | 307/52 |
| 7,783,924 | B2 | * | 8/2010 | Zaman et al. | 714/22 |
| 7,908,504 | B2 | * | 3/2011 | Feldman et al. | 713/340 |
| 7,924,045 | B2 | * | 4/2011 | Dishman et al. | 324/764.01 |
| 2004/0184290 | A1 | * | 9/2004 | Elgert et al. | 363/16 |
| 2005/0289393 | A1 | * | 12/2005 | Bibikar et al. | 714/14 |
| 2006/0087868 | A1 | * | 4/2006 | Jang et al. | 363/21.14 |
| 2008/0240741 | A1 | * | 10/2008 | Sasama et al. | 399/9 |
| 2010/0061124 | A1 | * | 3/2010 | Gong et al. | 363/21.04 |
| 2010/0289463 | A1 | * | 11/2010 | Wang et al. | 323/247 |
| 2012/0124418 | A1 | * | 5/2012 | Liu et al. | 714/14 |

* cited by examiner

*Primary Examiner* — Bryce Bonzo
(74) *Attorney, Agent, or Firm* — Novak Druce Connolly Bove + Quigg LLP

(57) ABSTRACT

A circuit for displaying failure information of a power supply unit supplying power to a central processing unit includes a controller including a random access memory (RAM) to store failure information of the power supply unit, a DC power circuit, a processing unit connected to the controller for reading the fault reasons stored in the RAM, and a display unit to display the fault reasons. When the power supply unit does not operate, the DC power circuit supplies power to the controller, such that fault reasons stored in the RAM will not be lost.

5 Claims, 3 Drawing Sheets

CIRCUIT FOR DISPLAYING FAILURE INFORMATION OF POWER SUPPLY UNIT

BACKGROUND

1. Technical Field

The present disclosure relates to a display circuit for displaying failure information of a power supply unit.

2. Description of Related Art

Controllers are powered by power supply units which supply power for a central processing unit. A register of the controller stores failure information of the power supply unit. When the power supply unit does not operate, the data stored in the register are lost. As a result, operators must test each pin of the power supply unit to find out why the power supply unit failed, which can be time-consuming.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
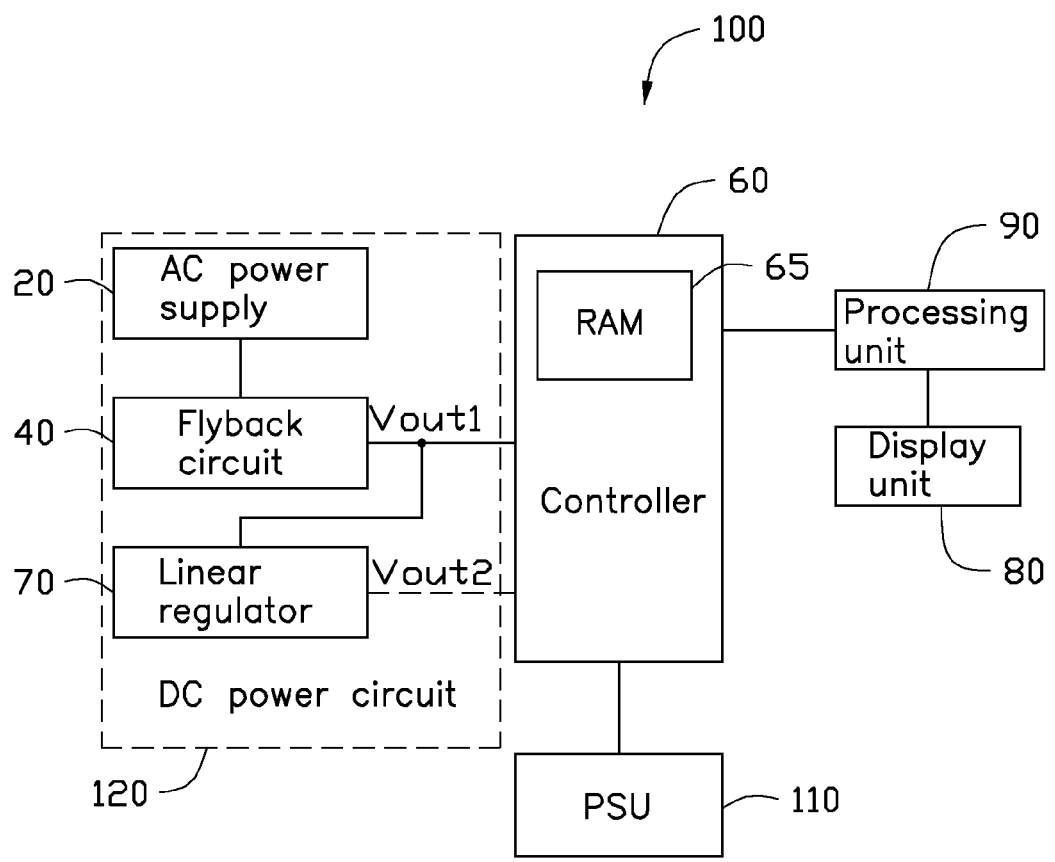
FIG. 1 is a block diagram of an exemplary embodiment of a circuit, wherein the circuit includes a flyback circuit, a linear regulator, and a processing unit.

Referring to FIG. 1, a circuit 100 is mounted on a motherboard, for displaying failure information of a power supply unit (PSU) 110 supplying power for a central processing unit (CPU) of the motherboard. An exemplary embodiment of the circuit 100 includes a flyback circuit 40, a linear regulator 70, a controller 60, a processing unit 90, and a display unit 80.

Figure 2:
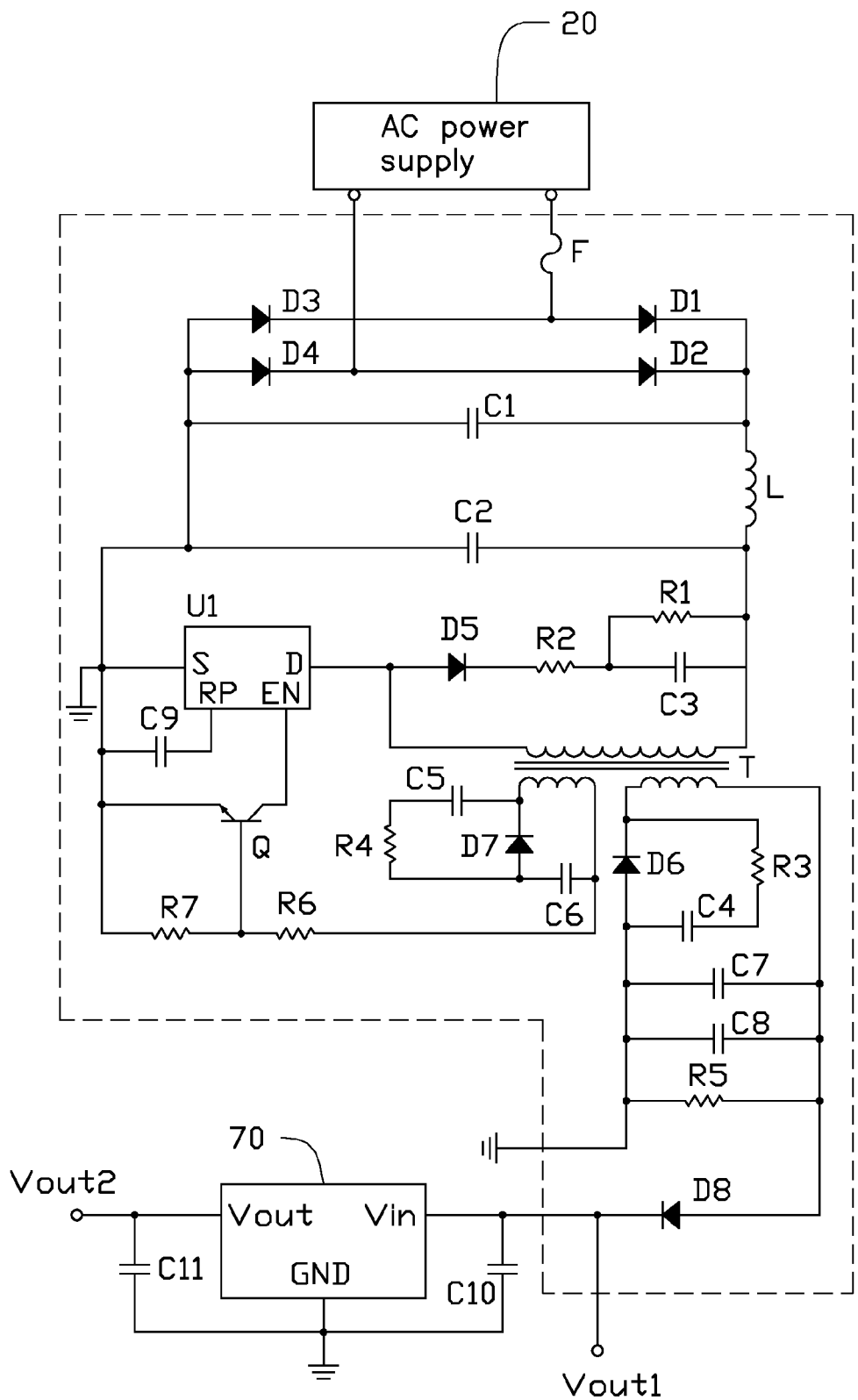
FIG. 2 is a circuit diagram of the flyback circuit and the linear regulator of FIG. 1.

Referring to FIG. 2, the flyback circuit 40 is connected to an alternating current (AC) power supply 20, for converting an AC power from the AC power supply 20 to a direct current (DC) power. The flyback circuit 40 includes diodes D1-D8, resistors R1-R7, capacitors C1-C9, an inductor L, a transformer T, a transistor Q, a fuse F, and an integrated circuit (IC) chip U1.

Cathodes of the diodes D1 and D2 are connected to anodes of the diodes D3 and D4 through the capacitor C1. Anodes of the diodes D1 and D2 are respectively connected to cathodes of the diodes D3 and D4. The anode of the diode D1 is further connected to a live wire of the AC power supply 20. The anode of the diode D2 is connected to a neutral wire of the AC power supply 20. The cathodes of the diodes D1 and D2 are grounded through the inductor L and the capacitor C2 connected in series. The anodes of the diodes D3 and D4 are grounded. A node between the inductor L and the capacitor C2 is connected to first terminals of the resistor R1 and the capacitor C3. Second terminals of the resistor R1 and the capacitor C3 are connected to a cathode of the diode D5 through the resistor R2. An anode of the diode D5 is connected to a first terminal of a primary coil of the transformer T. A second terminal of the primary coil of the transformer T is connected to the first terminal of the capacitor C3. A first terminal of a first secondary coil of the transformer T is connected to an anode of the diode D8. A cathode of the diode D8 functions as an output Vout1 of the flyback circuit 40. A second terminal of the first secondary coil of the transformer T is connected to a cathode of the diode D6. An anode of the diode D6 is grounded. An anode of the diode D8 is connected to the anode of the diode D6 through the capacitor C7, the capacitor C8, and the resistor R5 connected in parallel. The cathode of the diode D6 is connected to the anode of the diode D6 through the resistor R3 and the capacitor C4 connected in series. A first terminal of a second secondary coil of the transformer T is connected to an anode of the diode D7 through the capacitor C6. A cathode of the diode D7 is connected to a second terminal of the second secondary coil of the transformer T. The cathode of the diode D7 is further connected to the anode of the diode D7 through the capacitor C5 and the resistor R4 connected in series. A data pin D of the IC chip U1 is connected to the anode of the diode D5. An enable pin EN of the IC chip U1 is connected to a collector of the transistor Q. A ground pin RP of the IC chip U1 is grounded through the capacitor C9. A data pin S of the IC chip U1 is grounded. An emitter of the transistor Q is grounded. A base of the transistor Q is connected to the first terminal of the second secondary coil of the transformer T through the resistor R6. The base of the transistor Q is further grounded through the resistor R7.

The linear regulator 70 converts the DC power from the flyback circuit 40 to another DC power. A voltage input Vin of the linear regulator 70 is connected to the output Vout1 of the flyback circuit 40. The voltage input Vin of the linear regulator 70 is grounded through a capacitor C10. A voltage output Vout2 of the linear regulator 70 is grounded through a capacitor C11.

The controller 60 includes a random access memory (RAM) 65. The controller 60 stores fault reasons of the PSU 110 in the RAM 65. In the embodiment, the fault reasons of the PSU 110 refer to why the PSU 110 does not operate. The PSU 110 supplies power for the RAM 65. As a result, if the PSU 110 does not operate, data stored in the RAM 65 are lost.

The processing unit 90 reads the fault reasons stored in the RAM 65, and displays the fault reasons of the PSU 110 on the display unit 80.

Figure 3:
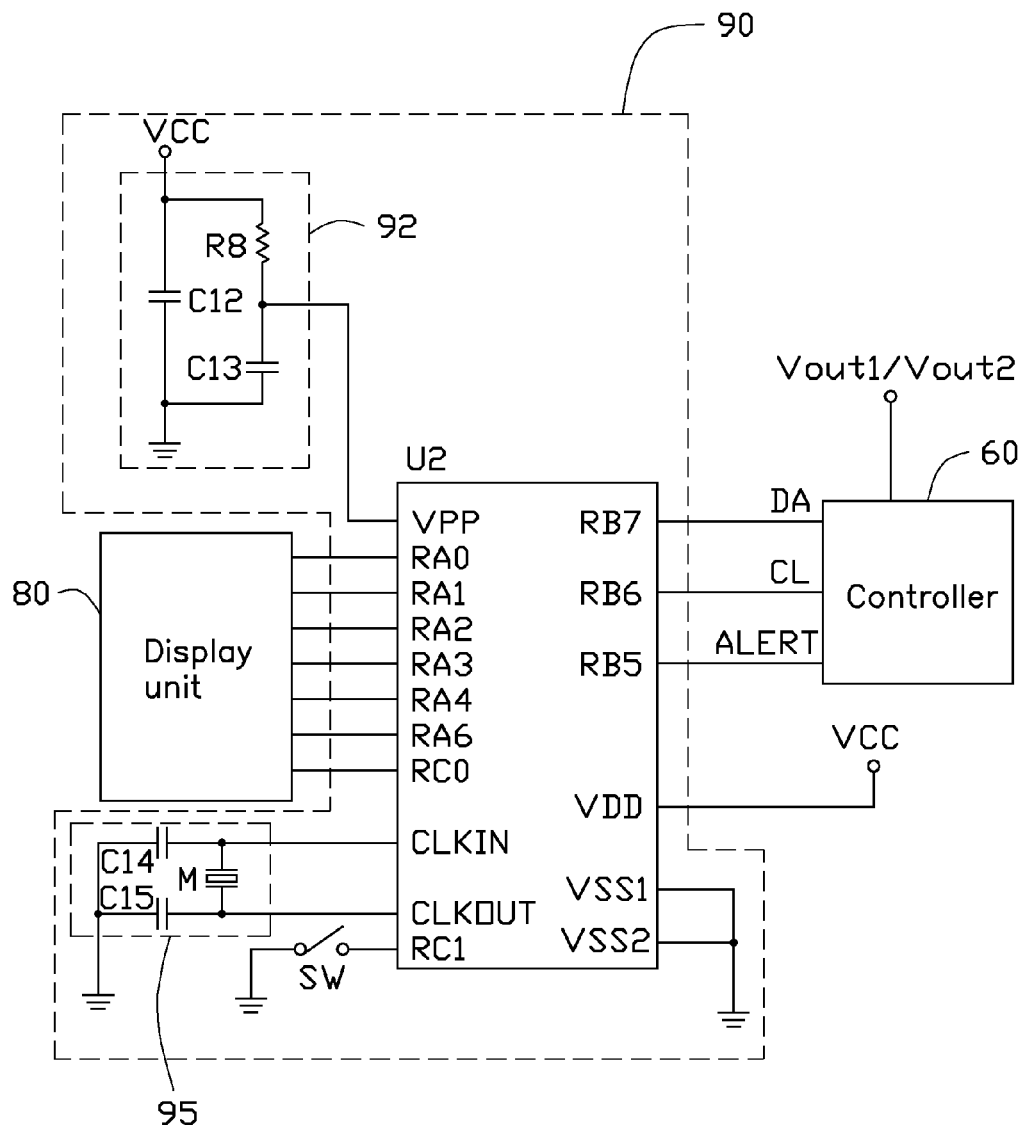
FIG. 3 is a circuit diagram of the processing unit of FIG. 1.

Referring to FIG. 3, the processing unit 90 includes a chip U2, a filtering circuit 92, and an oscillating circuit 95. The filtering circuit 92 includes capacitors C12 and C13, and a resistor R18. The oscillating circuit 95 includes capacitors C14 and C15, and a crystal oscillator M.

A first terminal of the capacitor C12 is connected to a 5 volt DC power VCC, a second terminal of the capacitor C12 is grounded. The resistor R8 and the capacitor C13 are connected in series between the first and second terminals of the capacitor C12. A node between the resistor R8 and capacitor C13 is connected to a voltage pin VPP of the chip U2. Two terminals of the crystal oscillator M are respectively connected to clock pins CLKIN and CLKOUT of the chip U2. The two terminals of the crystal oscillator M are grounded respectively through the capacitors C14 and C15. Outputs RA0-RA6 and RC0 of the chip U2 are connected to the display unit 80. Inputs RB7, RB6, and RB5 of the chip U2 are respectively connected to a data pin DA, a clock pin CL, and a detection pin ALERT of the controller 60. A voltage pin VDD of the chip U2 is connected to the DC power VCC. An input RC1 of the chip U2 is grounded through a switch SW. Ground pins VSS1 and VSS2 of the chip U2 are grounded.

In the embodiment, the AC power supply 20 provides 220 or 110 volt commercial AC power. The flyback circuit 40 converts the 220 or 110 volt AC power to a 5 volt DC power. The linear regulator 70 converts the 5 volt DC power to a 3.3 volt DC power. In the embodiment, the 5 volt DC power VCC can be provided by a DC power supply from the motherboard, or the flyback circuit 40.

From descriptions described above, the linear regulator 70 outputs a power different from the flyback circuit 40. As a result, the circuit can meet different controllers with different working voltages. In other words, when the PSU 110 does not operate, and if a work voltage of the controller 60 is 5 volts, the linear regulator 70 can be omitted, and the controller 60 is connected to the output Vout1 of the flyback circuit 40. If the work voltage of the controller 60 is 3.3 volts, the controller 60 is connected to the output Vout2 of the linear regulator 70. As a result, even if the PSU 110 does not operate, the controller 60 keeps operating. In this condition, the switch SW is turned on. The chip U2 can read the fault reasons stored in the RAM 65.

From description described above, the AC power supply 20, the flyback circuit 40, and the linear regulator 70 supply DC power to the controller 60 to make the RAM 65 store the fault reasons. The flyback circuit 40, and the linear regulator 70 compose of a DC power circuit 120. In other embodiments, other DC power circuits can replace the AC power supply 20, the flyback circuit 40, and the linear regulator 70.

The foregoing description of the exemplary embodiments of the disclosure has been presented only for the purposes of illustration and description and is not intended to be exhaustive or to limit the disclosure to the precise forms disclosed. Many modifications and variations are possible in the light of everything above. The embodiments were chosen and described in order to explain the principles of the disclosure and their practical application so as to enable others of ordinary skill in the art to utilize the disclosure and various embodiments with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A circuit for displaying failure information of a power supply unit, the power supply unit supplying power to a central processing unit, the circuit comprising:
   a controller comprising a random access memory (RAM), wherein the RAM stores failure information of the power supply unit in response to the controller being powered;
   a direct current (DC) power circuit, wherein the DC power circuit supplies power to the controller in response to the power supply unit being inoperative;
   a processing unit connected to the controller for reading the failure information stored in the RAM; and
   a display unit connected to the processing unit to display the failure information;
   wherein the processing unit comprises a chip, a filtering circuit, and an oscillating circuit, the filtering circuit comprises twelfth and thirteenth capacitors, and an eighth resistor, the oscillating circuit comprises fourteenth and fifteenth capacitors, and a crystal oscillator, a third DC power is grounded through the twelfth capacitor, and is grounded through the eighth resistor and the thirteenth capacitor connected in series, a node between the eighth resistor and the thirteenth capacitor is connected to a voltage pin of the chip, two terminals of the crystal oscillator are respectively connected to clock pins of the chip, the two terminals of the crystal oscillator are grounded respectively through the fourteenth and fifteenth capacitors, first to eighth outputs of the chip are connected to the display unit, first to third inputs of the chip are respectively connected to a data pin, a clock pin, and a detect pin of the controller, a voltage pin of the chip is connected to the third DC power, a fourth input of the chip is grounded through a switch, and ground pins of the chip are grounded.

2. The circuit of claim 1, wherein the DC power circuit comprises an alternating current (AC) power supply and a flyback circuit, the flyback circuit converts an AC power from the AC power supply to a first DC power.

3. The circuit of claim 2, wherein the flyback circuit comprises first to eighth diodes, first to seventh resistors, first to ninth capacitors, an inductor, a transformer, a fuse, and an integrated circuit (IC) chip; cathodes of the first and second diodes are connected to anodes of the third and fourth diodes through the first capacitor, anodes of the first and second diodes are respectively connected to cathodes of the third and fourth diodes, the anode of the first diode is connected to a live wire of the AC power supply, the anode of the second diode is connected to a neutral wire of the AC power supply, the cathodes of the first and second diodes are grounded through the inductor and the second capacitor connected in series, the anodes of the third and fourth diodes are grounded, a node between the inductor and the second capacitor is connected to first terminals of the first resistor and the third capacitor, second terminals of the first resistor and the third capacitor are connected to a cathode of the fifth diode through the second resistor, an anode of the fifth diode is connected to a first terminal of a primary coil of the transformer, a second terminal of the primary coil of the transformer is connected to the first terminal of the third capacitor, a first terminal of a first secondary coil of the transformer is connected to an anode of the eighth diode, a cathode of the eighth diode functions as an output of the flyback circuit and is connected to the controller, a second terminal of the first secondary coil of the transformer is connected to a cathode of the sixth diode, an anode of the sixth diode is grounded, the anode of the eighth diode is connected to the anode of the sixth diode through the seventh capacitor, the eighth capacitor, and the fifth resistor in parallel, the cathode of the sixth diode is connected to the cathode of the sixth diode through the third resistor and the fourth capacitor connected in series, a first terminal of a second secondary coil of the transformer is connected to an anode of the seventh diode through the sixth capacitor, a cathode of the seventh diode is connected to a second terminal of the second secondary coil, the cathode of the seventh diode is further connected to the anode of the seventh diode through the fifth capacitor and the fourth resistor connected in series, a first data pin of the IC chip is connected to the anode of the fifth diode, an enable pin of the IC chip is connected to a collector of the transistor, a ground pin of the IC chip is grounded through the ninth capacitor, a second data pin of the IC chip is grounded, an emitter of the transistor is grounded, a base of the transistor is connected to the first terminal of the second secondary coil, the base of the transistor is further grounded through the seventh resistor.

4. The circuit of claim 3, wherein the DC power circuit further comprises a linear regulator, tenth and eleventh capacitors, a voltage input of the linear regulator is connected to the output of the flyback circuit, the voltage input of the linear regulator is further grounded through the tenth capacitor, a voltage output of the linear regulator is grounded through the eleventh capacitor; the linear regulator converts the first DC power from the flyback circuit to a second DC power.

5. A circuit for displaying failure information of a power supply unit, the power supply unit supplying power to a central processing unit, the circuit comprising:
 a controller comprising a random access memory (RAM), wherein the RAM stores failure information of the power supply unit in response to the controller being powered;
 a direct current (DC) power circuit, wherein the DC power circuit supplies power to the controller in response to the power supply unit being inoperative;
 a processing unit connected to the controller for reading the failure information stored in the RAM; and
 a display unit connected to the processing unit to display the failure information;
 wherein the DC power circuit comprises an alternating current (AC) power supply and a flyback circuit, the flyback circuit converts an AC power from the AC power supply to a first DC power; and
 wherein the flyback circuit comprises first to eighth diodes, first to seventh resistors, first to ninth capacitors, an inductor, a transformer, a fuse, and an integrated circuit (IC) chip; cathodes of the first and second diodes are connected to anodes of the third and fourth diodes through the first capacitor, anodes of the first and second diodes are respectively connected to cathodes of the third and fourth diodes, the anode of the first diode is connected to a live wire of the AC power supply, the anode of the second diode is connected to a neutral wire of the AC power supply, the cathodes of the first and second diodes are grounded through the inductor and the second capacitor connected in series, the anodes of the third and fourth diodes are grounded, a node between the inductor and the second capacitor is connected to first terminals of the first resistor and the third capacitor, second terminals of the first resistor and the third capacitor are connected to a cathode of the fifth diode through the second resistor, an anode of the fifth diode is connected to a first terminal of a primary coil of the transformer, a second terminal of the primary coil of the transformer is connected to the first terminal of the third capacitor, a first terminal of a first secondary coil of the transformer is connected to an anode of the eighth diode, a cathode of the eighth diode functions as an output of the flyback circuit and is connected to the controller, a second terminal of the first secondary coil of the transformer is connected to a cathode of the sixth diode, an anode of the sixth diode is grounded, the anode of the eighth diode is connected to the anode of the sixth diode through the seventh capacitor, the eighth capacitor, and the fifth resistor in parallel, the cathode of the sixth diode is connected to the cathode of the sixth diode through the third resistor and the fourth capacitor connected in series, a first terminal of a second secondary coil of the transformer is connected to an anode of the seventh diode through the sixth capacitor, a cathode of the seventh diode is connected to a second terminal of the second secondary coil, the cathode of the seventh diode is further connected to the anode of the seventh diode through the fifth capacitor and the fourth resistor connected in series, a first data pin of the IC chip is connected to the anode of the fifth diode, an enable pin of the IC chip is connected to a collector of the transistor, a ground pin of the IC chip is grounded through the ninth capacitor, a second data pin of the IC chip is grounded, an emitter of the transistor is grounded, a base of the transistor is connected to the first terminal of the second secondary coil, the base of the transistor is further grounded through the seventh resistor.

\* \* \* \* \*